United States Patent Office 3,272,339
Patented Sept. 13, 1966

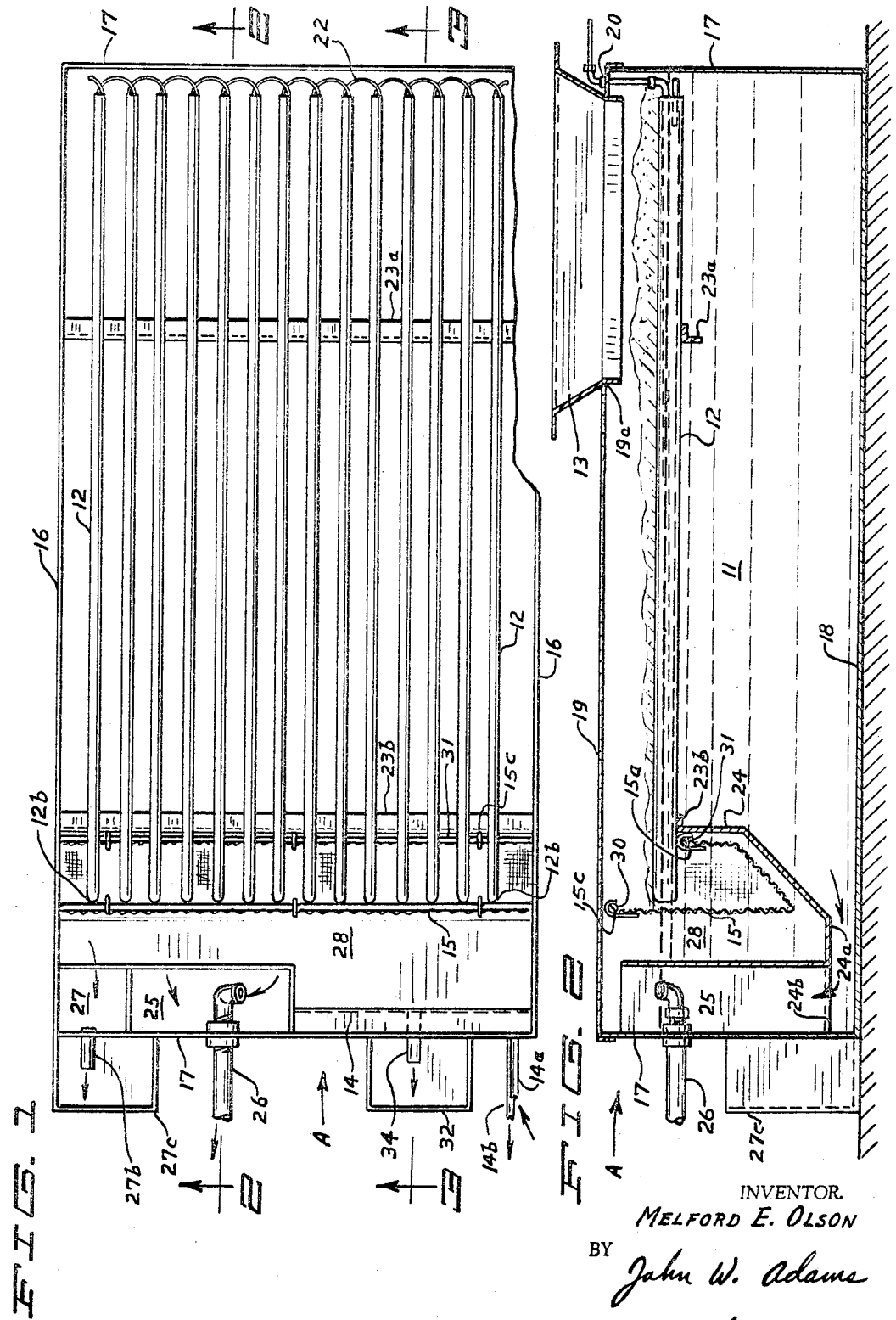

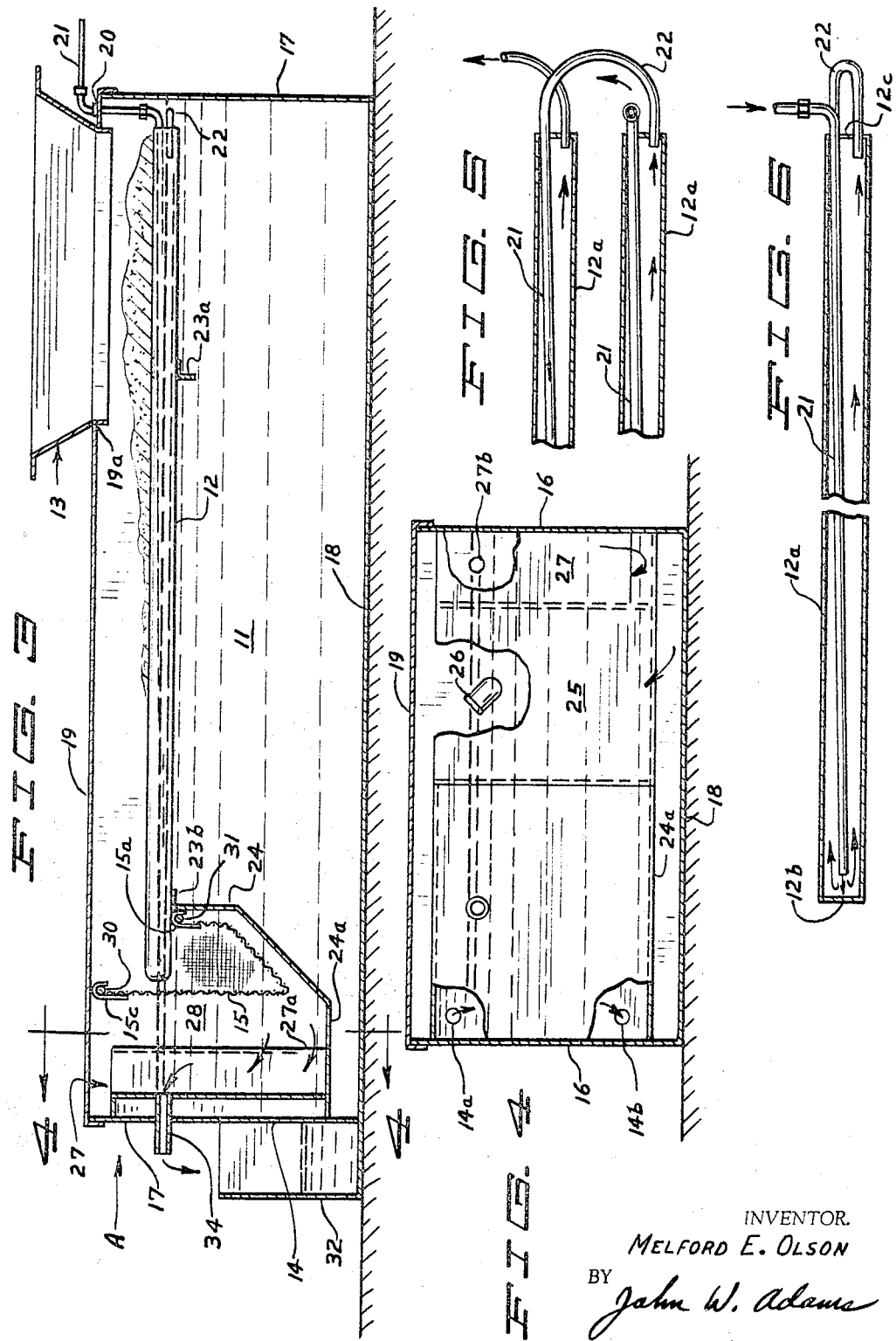

3,272,339
BEESWAX CAPPING MELTER
Melford E. Olson, 4749 Florida Ave. N.,
Minneapolis, Minn.
Filed May 3, 1963, Ser. No. 277,771
4 Claims. (Cl. 210—182)

This invention relates generally to a beeswax capping melter for the separation of honey therefrom, and more specifically to a capping melter wherein beeswax and warmed honey are separated from cool honey, and further where pure beeswax is separated from undesirable impurities such as slumgum.

A beeswax capping is comprised of beeswax, honey and a small amount of impurities generally known as slumgum. It is the usual procedure to separate these ingredients by applying heat to the capping and as the capping melts to separate the products produced thereby by skimming the surface thereof. The products will naturally separate into a lower layer comprised of substantially cool honey, a layer of hot honey directly thereon and a mixture of hot beeswax and slumgum floating on the surface of the hot honey. The most desirable product resulting from this separation is the cool honey for whenever honey is raised to an elevated temperature it incurs damage both as to flavor and color. It is, therefore, most desirable in the honey recovering process to provide for a maximum of cool undamaged honey which has been minimally intermixed with the hot honey. It is also most desirable to be able to separate the pure beeswax of the capping from the impurities which may exist in the capping such that no further refining process must be performed thereon.

In accordance with these desires applicant has provided a beeswax capping melter wherein the amount of cool honey which has been intermixed with honey and beeswax of an elevated temperature is at a minimum and which is further designed to allow the recovering of a maximum amount of beeswax in its purest form.

It is an object of this invention to provide a capping melter wherein a separation tank is provided with a heating unit arranged on the upper portion thereof such that beeswax cappings placed thereon will be immediately heated thereby and a maximum of honey will be immediately released therefrom to pass through the heating unit into the lower portion of the tank where it may be withdrawn in a relatively cool state, having been exposed to the heating unit for a minimum amount of time.

It is a specific object of this invention to provide a beeswax capping melter wherein a maximum amount of cool unheated honey will be contained in the lower portion thereof and upon which a layer of hot honey and beeswax will float such that the hot honey and beeswax may be efficiently removed therefrom with a minimum of intermixing of the heated products with the cool honey.

It is a further specific object to provide a beeswax capping melter having a heating unit therein which is designed to admit a heating medium through one end thereof and to allow exit of this medium through the same end such that one end of the heating unit will be substantially free standing to allow the unhampered flow of beeswax therepast, and further to facilitate the cleaning of beeswax and slumgum therefrom by scraping the same through the free standing end.

It is a further specific object to provide a beeswax separation means which will completely remove the slumgum impurities from beeswax as it passes therethrough such that the beeswax withdrawn from the capping melter will be substantially free from all impurities.

It is a further specific object to provide a plurality of separating partitions within a beeswax capping melter such that the products produced therein will be completely separated as they flow past said partitions.

These and other objects and advantages of this invention will more fully appear from the following description made in connection with the accompanying drawings, wherein like reference characters refer to the same or similar parts throughout the several views, and in which:

FIG. 1 is a plan view of the capping melter of this invention with the top cover and hopper removed;

FIG. 2 is a vertical section taken substantially along line 2—2 of FIG. 1;

FIG. 3 is a vertical section taken substantially along line 3—3 of FIG. 1;

FIG. 4 is a vertical section taken substantially along line 4—4 of FIG. 3;

FIG. 5 is a partial horizontal section through a pair of heating elements; and

FIG. 6 is a vertical section taken through a single heating element.

As shown in the accompanying drawings, a capping melter generally designated A includes a heater tank 11 with a plurality of heaters 12 arranged longitudinally therein and spaced transversely thereacross to thoroughly heat beeswax cappings as they are placed thereon as through a funnel-shaped inlet 13 arranged to overlie one end 12c of the heaters 12 and which is generally designated 13. A slumgum collection basket 15 for trapping slumgum therein as it is carried therethrough by heated beeswax is arranged in close relation to the other end 12b of the heaters 12 and is further maintained behind a separating partition 24 which initially separates the cool honey from the hot honey and beeswax as they flow through the tank 11. A plurality of partitions are arranged within the tank 11 at one end thereof and form compartments for the withdrawal and separation of the products recovered from the cappings. The tank 11 also includes a steam cavity 14 at the product discharge end of the tank 11 which aids in heating the wax prior to the final withdrawal thereof.

More specifically, the heater tank comprises a pair of upstanding side members 16 and cooperating end members 17 all of which are sealingly connected to a flat bottom member 18 which forms the base of the tank 11. In general, the heaters comprise a plurality of individual heating members 12 which are parallelly spaced transversely across the tank and are arranged to have one end 12c thereof in close relation to one end of the tank such that steam or other heating medium may be connected thereto. In the form shown, the heaters extend longitudinally across the tank 11 such that a sufficiently large heating area is formed thereby. The heaters are supported in spaced relation from the bottom 18 of the tank 11 by a pair of angle supports 23a–23b attached to the side walls 16 of the tank such that as cappings melt thereon honey will flow therethrough to the lower portion of the tank 11.

As best shown in FIG. 1, the individual heaters 12 are substantially free standing in that no spacing or connecting members other than the support bars 23a–23b therebeneath are provided between heaters 12 for the free unbarred flow of products therebetween.

A cool honey separation partition 24 is, in the form shown, attached to the inwardly disposed heating unit support member 23b and extends therefrom downwardly to a substantially flat closure end 24a which is sealingly attached to one end 17 of the tank 11 to form a cool honey portion of the tank 11 along the entire bottom surface 18 of the tank 11. A cool honey withdrawal compartment, generally designated 25 and as best shown in FIG. 1, extends upwardly from the flat closure section 24a of the cool honey compartment and is provided with a communicating passage 24b therebetween with a withdrawal tube 26 which extends through the tank end member 17 for the withdrawal of cool honey therethrough.

Through this partition 24 arrangement the cool honey is allowed to be separated from the cappings and pass immediately downwardly through the heating units 12 to completely occupy the cool honey storage compartment which is bounded by the partition 24, side tank members 16 and tank end members 17. The cool honey will pass therefrom below the flat closure partition 24a and upwardly into the withdrawal compartment 25 where it may be removed through the nozzle or tube 26.

A slumgum collection basket, generally designated 15 and comprised of foraminous or expanded material, is arranged in a hot honey and beeswax collection compartment 28 of the tank 11 immediately behind the cool honey separation barrier 24 and, in the form shown, comprises an open top basket arranged with hook elements 15a on the front side thereof which engage a basket support bar 31 directly underlying one end 12b of the heaters 12 and hook elements 15c on the rear side thereof engaging a second support bar 30 such that the basket 15 may be easily removed therefrom for cleaning of slumgum collected therein. The support bars 30–31 extend transversely between the side walls 16 of the tank 11. By providing the slumgum basket 15 in this position, it is obvious that beeswax carried along on the surface of the cool honey will pass over the separation barrier 24 and flow into the collection basket 15. As it flows therethrough, the slumgum carried with the beeswax will adhere to the foraminous material forming the basket 15 and be collected therein for easy removal at the end of a capping run.

The major percentage of slumgum adheres to the heaters 12 with a lesser amount being carried by the beeswax. For efficient operation the slumgum must be removed from the heaters and for this a rake (not shown) is provided which has tine members conforming to the shape and spacing of the heaters 12 for effective scraping thereof. The heaters 12, being unconnected at one end 12b, will allow the rake to pass thereby and remove the slumgum adherence into the basket 15.

As the warmed honey and beeswax pass into the partition compartment 28, the beeswax being relatively warmer and substantially lighter will float on the top thereof, thereby allowing the hot honey to pass into a removal compartment generally designated 27 having a honey-receiving opening 27a on the bottom thereof and a hot honey withdrawal conduit 27b at the top thereof so that hot honey may pass therethrough into a collection compartment 27c on the outside of the tank 11. The wax in the separation compartment 28 may require additional heating for flowing withdrawal thereof and therefore a steam cavity 14 is arranged in adjacent relation to the compartment 28 such that steam may pass therethrough through the entrance conduit 14a and withdrawal conduit 14b. This steam serves to slightly heat the wax and hot honey in the compartment 28 and allow the wax to freely pass from the compartment 28 to a wax collection chamber 32 outside the tank 11 as by the conduit 34.

More specifically, the heating system comprises a plurality of individual heating elements 12 as best illustrated in FIG. 6 and a heating medium manifold and distribution arrangement as best illustrated in FIG. 5. Each of the individual heaters 12 includes a substantially hollow body member 12a which has a free end 12b closed and is provided with heating medium connections on the other end 12c thereof. As best illustrated in FIGS. 5 and 6, the heating elements 12 are connected in series and are fed by an input line 21 connected thereto. Each of the hollow body members 12a is provided with a substantially thin conduit 21 extending substantially the entire length thereof and inserted therein to receive steam or the like and discharge the same at the end of the conduit 21 which is loctaed in closely spaced relation to the closed end 12b of the heating element body 12a. By providing the input conduit in this relation in each of the individual heaters 12, the flow of heat will be outward from the closed end 12b and positively insure that the entire heating element 12 will be rapidly heated. The discharge from each individual element 12 is conveyed therefrom by a discharge conduit 22 which serves as the input conduit 21 in the next adjacent heating element 12, as best shown in FIG. 5. This arrangement allows the individual heaters 12 to have only one connection point to the next adjacent heating element and thus be free standing along their entire length for ease of cleaning and to facilitate flow of products therepast. A discharge outlet is arranged to carry the used steam from the last heater 12 away from the tank 11. A thermostat and pressure indicating means may be arranged on the steam lines for the control of the steam passing therethrough, and it has been found that a steam pressure of approximately 8 to 25 lbs. is efficient for this series connection of heating elements 12.

A top cover unit, generally designated 19, may be arranged to overlie the tank and in the form shown is provided with a funnel-shaped hopper 13 on one end thereof passing through an opening 19a in the cover 19 which is in close vertical relation to one end 12c of the heater elements 12 as shown in FIG. 3. Steam conduit inlet and outlet openings 20 may also be arranged in the cover 19.

In operation of this capping melter, a steam connection is made on the input conduit 21 and an appropriate discharge line is connected to the discharge end of the heating elements 12 and steam is introduced therein. Beeswax cappings are then poured into the hopper 13 where they will fall upon the now-heated grill work of heating elements 12. As they lie thereon and the beeswax is melted by the elevated temperature of the heating elements 12, honey will be immediately released therefrom. Naturally, the first honey released will be relatively cool and will account for the majority of the honey in the capping. As the honey fills the cold honey storage portion of the tank to a level immediately under the heating elements 12, the immediate top layer thereof will be more highly heated than that therebelow, and it is this portion of the honey and the heated beeswax immediately thereabove that the operator wishes to remove. As the melted volume increases within the tank 11 the natural flow of the cold honey through the cold honey removal compartment 25 will cause the entire volume to flow towards the discharge end of the tank. By providing the uppermost layer of the products to consist of approximately one inch of wax and a substantially less thick layer of hot honey therebelow, the melter will operate most efficiently, and the hot honey and wax will flow over the partition 24 through the collection basket 15 and into the compartment 28. As the beeswax passes through the foraminous slumgum collection basket 15, slumgum will adhere thereto and be removed from the beeswax which may then be withdrawn through the beeswax withdrawal conduit 34. Occasionally, it has been found that the beeswax will cool immediately after leaving the surface of the heating elements 12 and therefore a steam cavity 14 is arranged adjacent the compartment 28 so that the beeswax may be reheated to facilitate flow through the withdrawal conduit 34.

The heated honey having passed over the partition 24 with the beeswax and being heavier than the beeswax will pass into the hot honey removal compartment 27 through the opening 27a on the lower end thereof and may be easily withdrawn through the conduit 27b. If the heating elements 12 should become coated with either wax or slumgum during the operation thereof or whenever it is necessary to clean the capping melter, such as at the end of a capping run, a rake member (not shown) which conforms to the shape of the heating elements may be provided such that the elements may be scraped entirely therealong and the adherence thereon raked into the slumgum basket 15. The basket 15 may be removed for cleaning by unhooking the same from the support bars 30 and 31 and cleaning in hot water.

With this improved capping melter, it is obvious that the operation is substantially automatic other than for the introduction of beeswax cappings, and the melter is particularly easy to maintain in a clean, sanitary condition because of the addition of free standing heating elements which are easily cleanable.

It will, of course, be understood that various changes may be made in the form, details, arrangements and proportion of parts without departing from the scope of the invention, which generally stated consists in the matter set forth in the appended claims.

What I claim is:

1. A capping melter for recovering honey, beeswax and other capping products comprising:
   (a) a separating tank;
   (b) a plurality of elongated substantially parallel heating elements mounted horizontally in the upper portion of the tank and provided with heat supplying connection means on one end thereof, the other end of said elements being independent of one another and being substantially free along the entire length thereof to permit unobstructed flow and scraping therealong throughout substantially the entire length thereof to remove products collected thereon;
   (c) means for discharging honey and beeswax to be separated on the top surface of said heating elements adjacent said one end;
   (d) means supplying heat to said elements to melt honey-containing beeswax cappings supplied thereto;
   (e) a partition means extending across said tank, the upper edge of said partition means terminating below said heating elements to provide a melted honey collection compartment and a first melted honey withdrawal compartment therein;
   (f) communication means between said first honey withdrawal compartment and the lower portion of said melted honey collection compartment; and
   (g) a second collection compartment provided by said partition means adjacent said other end of said element to receive hot honey and beeswax flowing above said heating elements with means for separately withdrawing the honey and wax from said second compartment.

2. The structure set forth in claim 1 and a hot honey withdrawal compartment communicating at a lower portion thereof with said second collection compartment to facilitate separation of said hot honey and beeswax.

3. The structure set forth in claim 1 and a removable foraminous collection basket arranged to receive the hot honey and beeswax flowing over said partition means into said second collection compartment to entrap solid materials contained therewithin.

4. The structure set forth in claim 1 wherein said elongated heating elements are hollow and said heating supply means includes a heat medium supply conduit member received into said connection means on one end of said heating elements to extend longitudinally therein to discharge in close relation to the other end of said hollow portion and a discharge conduit received into the same end as said supply conduit establishing flow of the heating medium from the closed end thereof to facilitate completer heating of said hollow member.

References Cited by the Examiner

UNITED STATES PATENTS

| | | | |
|---|---|---|---|
| 1,263,944 | 4/1918 | Severin | 210—184 X |
| 1,875,305 | 8/1932 | Hill | 165—142 X |
| 2,520,304 | 8/1950 | Brand | 210—187 |
| 2,783,854 | 3/1957 | Lovelady et al. | 210—182 X |

REUBEN FRIEDMAN, *Primary Examiner.*

SAMIH N. ZAHARNA, *Examiner.*

C. DITLOW, *Assistant Examiner.*